United States Patent
Haub et al.

(10) Patent No.: US 9,379,747 B2
(45) Date of Patent: *Jun. 28, 2016

(54) DETECTION AND MITIGATION OF INTERFERENCE BASED ON INTERFERENCE LOCATION

(71) Applicant: Spreadtrum Communications USA Inc., San Diego, CA (US)

(72) Inventors: David Haub, San Diego, CA (US); Zhigang Xu, San Diego, CA (US); Jarrett Malone, Carlsbad, CA (US)

(73) Assignee: SPREADTRUM COMMUNICATIONS USA INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/820,395

(22) Filed: Aug. 6, 2015

(65) Prior Publication Data

US 2015/0349820 A1 Dec. 3, 2015

Related U.S. Application Data

(63) Continuation of application No. 14/311,610, filed on Jun. 23, 2014, now Pat. No. 9,112,569, and a continuation of application No. 13/540,116, filed on Jul. 2, 2012, now Pat. No. 8,761,702.

(51) Int. Cl.
| | |
|---|---|
| H04B 17/00 | (2015.01) |
| H04B 1/10 | (2006.01) |
| H04B 1/12 | (2006.01) |
| H04B 17/318 | (2015.01) |
| H04B 17/24 | (2015.01) |

(52) U.S. Cl.
CPC .............. *H04B 1/10* (2013.01); *H04B 1/1036* (2013.01); *H04B 1/123* (2013.01); *H04B 17/318* (2015.01); *H04B 17/24* (2015.01)

(58) Field of Classification Search
CPC ...... H04B 1/10; H04B 1/1036; H04B 17/345; H04W 72/085
USPC .............. 455/226.1, 278.1, 296, 63.1, 114.2; 375/346, 348
See application file for complete search history.

(56) References Cited

U.S. PATENT DOCUMENTS

| | | | | |
|---|---|---|---|---|
| 8,761,702 B2 * | 6/2014 | Haub | .................... | H04B 1/1036 455/226.1 |
| 9,112,569 B2 * | 8/2015 | Haub | .................... | H04B 1/1036 |
| 2007/0211813 A1 * | 9/2007 | Talwar | ................. | H04B 7/0417 375/267 |
| 2009/0086863 A1 * | 4/2009 | Komninakis | ............. | H04B 1/10 375/346 |
| 2015/0304056 A1 * | 10/2015 | Guo | ..................... | H04B 17/345 455/63.1 |

* cited by examiner

*Primary Examiner* — Sonny Trinh
(74) *Attorney, Agent, or Firm* — Ballard Spahr LLP

(57) ABSTRACT

Embodiments include a novel receiver architecture to optimize receiver performance in the presence of interference. In various embodiments, the presence of interference is detected, and the relative frequency location of the interference is detected. The relative frequency location specifies whether the frequency of the interference is high side (above the desired signal, i.e., at a higher frequency) or low side (below the desired signal). The receiver is configured based on the detected interference and relative location thereof. For a device such as a cellular phone that operates in a dynamic and changing environment where interference is variable, embodiments advantageously provide the capability to modify the receiver's operational state depending on the interference.

20 Claims, 12 Drawing Sheets

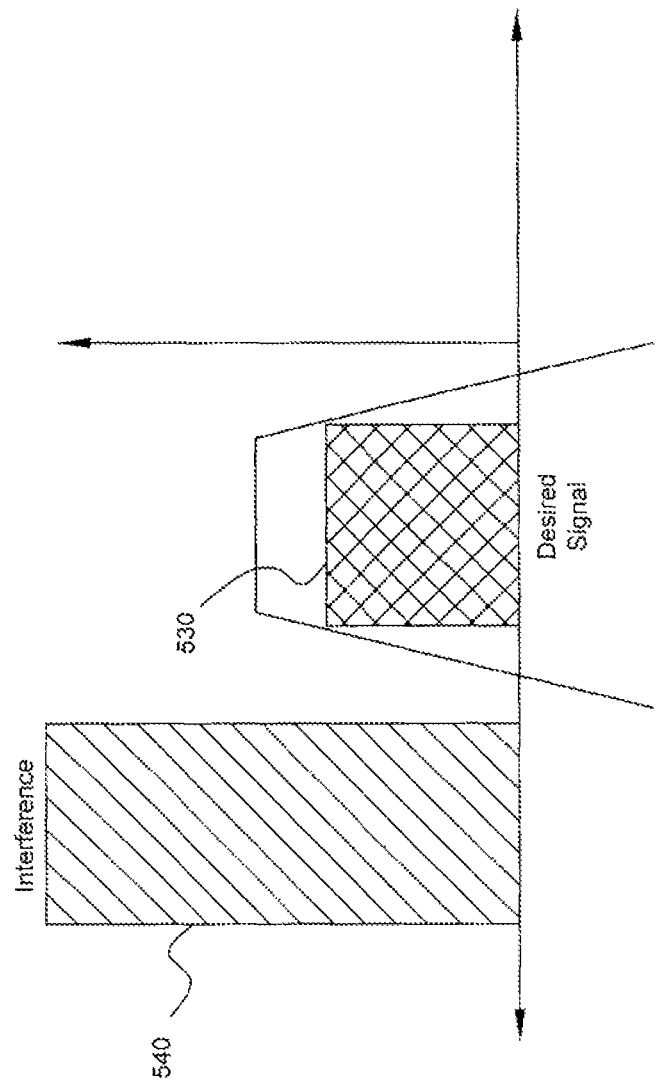

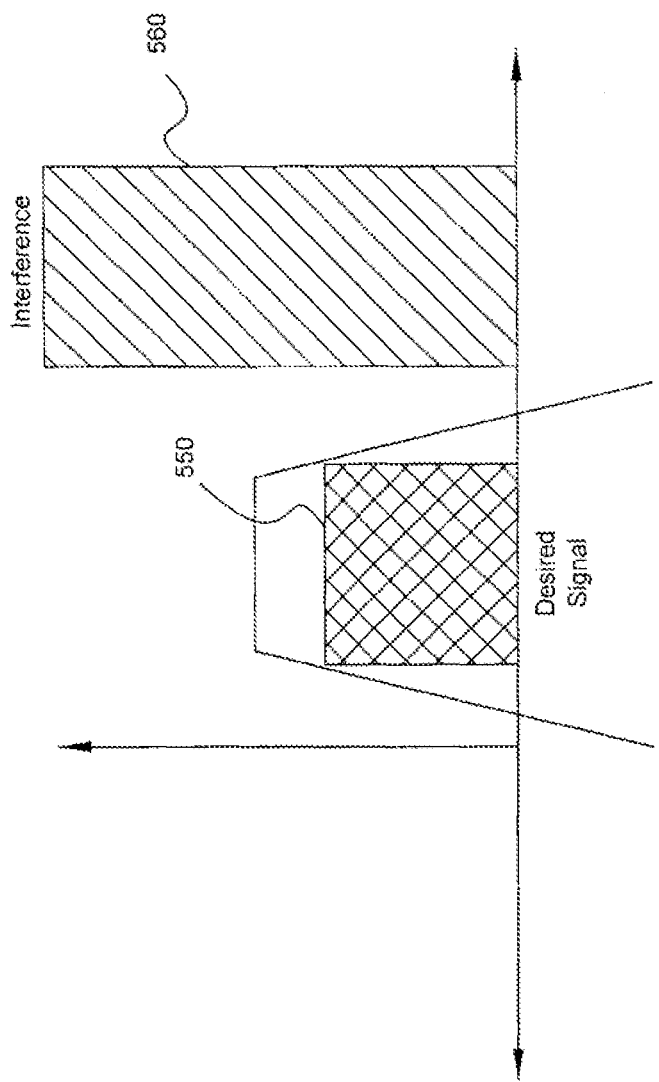

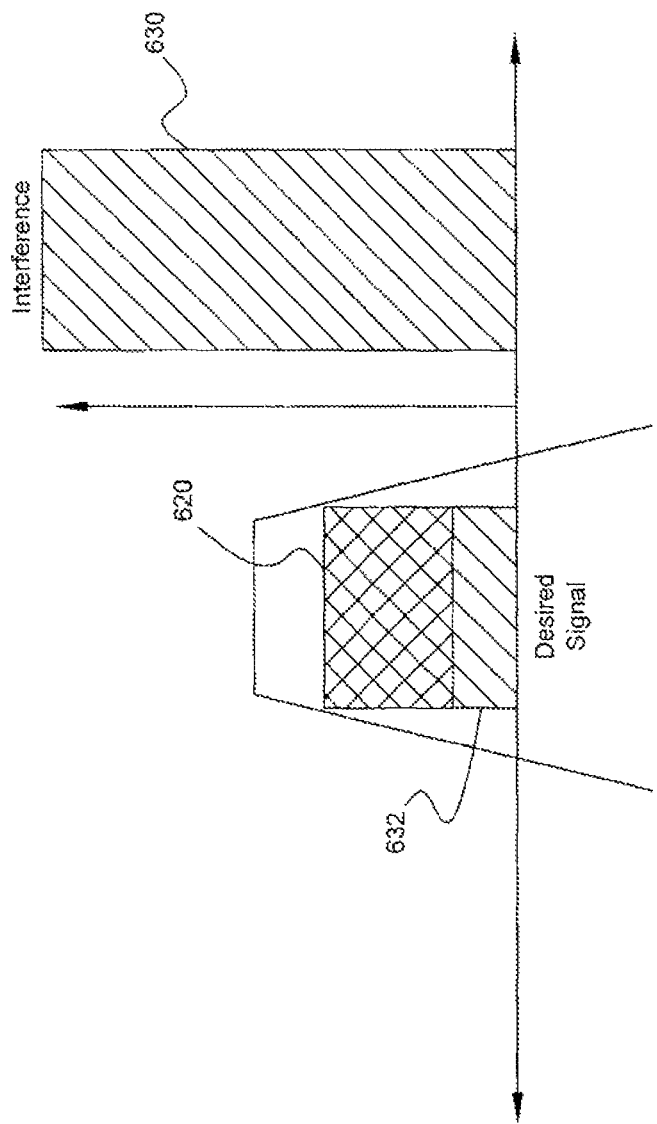

DETECTION AND MITIGATION OF INTERFERENCE BASED ON INTERFERENCE LOCATION

RELATED APPLICATIONS

The present application is a continuation of U.S. patent application Ser. No. 14/311,610, filed Jun. 23, 2014, now U.S. Pat. No. 9,112,569, which is a continuation of U.S. patent application Ser. No. 13/540,116, filed Jul. 2, 2012, now U.S. Pat. No. 8,761,702, the entirety of which are incorporated by reference herein.

FIELD

The present disclosure relates to receiver architectures in a communications system, and more particularly, some embodiments relate to methods and apparatuses for detecting and mitigating interference and optimizing receiver performance.

BACKGROUND

Radio frequency transceivers in cellular systems commonly receive and decode a desired signal in the presence of interference, which has commonly required a compromise in receiver performance. For example, in order to prevent clipping due to interference, several stages of narrow analog filters are typically found in conventional receiver designs. Such filters add current drain and distort the desired signal, thus degrading receiver performance. Additionally, the active stages of the receiver, particularly the radio frequency (RF) stages, are designed with high levels of linearity so that distortion is minimized in the presence of interference. This linearity often requires relatively high bias conditions and therefore requires relatively high current drain.

A typical prior art receiver architecture is shown in FIG. 1. This architecture represents a typical receiver implementation and is described in U.S. Pat. No. 6,498,926 to Ciccarelli et al. Within receiver 100, the transmitted RF signal is received by antenna 112, routed through duplexer 114, and provided to low noise amplifier (LNA) 116, which amplifies the RF signal and provides the signal to bandpass filter 118. Bandpass filter 118 filters the signal to remove some of the spurious signals which can cause intermodulation products in the subsequent stages. The filtered signal is provided to mixer 120, which downconverts the signal to an intermediate frequency (IF) with a sinusoidal signal from local oscillator 122. The IF signal is provided to bandpass filter 124, which filters spurious signals and downconversion products prior to the subsequent downconversion stage. The filtered IF signal is provided to variable gain amplifier (VGA) 126, which amplifies the signal with a variable gain to provide an IF signal at the required amplitude. The gain is controlled by a control signal from AGC control circuit 128. The IF signal is provided to demodulator 130, which demodulates the signal in accordance with the modulation format used at the transmitter (not shown).

For this prior art architecture, the local oscillator signal (LO) is either tuned to match the radio frequency signal (RF), so that the received signal is converted directly to baseband, or it is tuned to convert the received RF signal to some much lower intermediate frequency (IF) for further filtering. At baseband or IF, the filters are set to the bandwidth of the particular RF system to receive the desired signal and remove interference.

The architecture in FIG. 1 is designed to receive the desired signal in the presence of interference. The filter at baseband or IF is set to remove completely any interference, and the RF stage gain and bias are set to receive the signal with interference with minimal distortion. Thus, such a conventional system makes assumptions about the presence of interference, which may reduce interference at the expense of receiver performance when the expected interference is present, but which may constitute a wasteful approach when such assumptions are incorrect.

Another prior art receiver architecture is disclosed at U.S. Pat. No. 6,498,926 to Ciccarelli et al. In this prior art architecture, post-demodulation quality is used to set the bias conditions and therefore the linearity of the RF circuits. This prior art approach does not address the problem fully because the receiver state is adjusted based only on the baseband data quality measurement, which might be degraded for numerous reasons and not just due to interference and/or reduced RF linearity. Also, this architecture does not do anything to reduce the filtering requirement to match the actual interference conditions.

Another prior art receiver architecture is disclosed at U.S. Pat. No. 6,670,901 to Brueske et al. This prior art architecture includes an on-channel power detector, a wide band power detector, and an off-channel power detector. The wideband detector and off-channel detector will indicate if high levels of interference are present and allow adjustment of the receiver bias based on that. This prior art architecture suggests using the information from these power detectors to adjust the dynamic range of several blocks (LNA, mixer, filter, analog-to-digital (A/D) converter, and digital filter). By adjusting the dynamic range and/or bias of these stages, the current drain can be optimized. However, this prior art approach uses wideband detection without selectivity and therefore is unable to distinguish out-of-band interference, i.e., interference that is several channels away, from nearby interference in the adjacent or nearby channels. Therefore, the architecture cannot fully optimize the performance of the receiver.

Since an actual device such as a cellular phone operates in a dynamic and changing environment where interference is variable, it is desirable to be able to modify the receiver's operational state depending on the interference.

SUMMARY

In some embodiments of the present disclosure, an apparatus includes an amplifier configured to amplify an input signal. A local oscillator is configured to generate an oscillator signal. A mixer is coupled to the amplifier and is configured to mix the amplified input signal outputted by the amplifier with the oscillator signal. A baseband filter is configured to filter an output of the mixer to pass a selected band of frequencies. An interference frequency detection (IFD) module is coupled to an output of the baseband filter directly or via one or more intermediate components. The IFD module is configured to detect a relative frequency location of an interference signal, and to provide an IFD output signal indicative of the detection result. A state machine is coupled to an output of the first baseband filter directly or via or one more intermediate components. The state machine is further coupled to the IFD module and to the local oscillator. The state machine is configured to provide a feedback signal to the local oscillator, based on the IFD output signal, to cause the local oscillator to update the oscillator signal so that the amplified input signal, when mixed with the updated oscillator signal, is not located at a frequency band of the interference signal.

In some embodiments, an apparatus includes a first processing module and a second processing module configured to receive a first input signal and a second input signal, respectively. Each processing module includes an amplifier configured to amplify the input signal of that processing module, a local oscillator configured to generate an oscillator signal, a mixer coupled to the amplifier and configured to mix the amplified input signal outputted by the amplifier with the oscillator signal, and a baseband filter configured to filter an output of the mixer to pass a band of frequencies. A logic module is coupled to the first and second processing modules. The logic module includes an interference frequency detection (IFD) module coupled to an output of the baseband filter of the second processing module directly or via one or more intermediate components. The IFD module is configured to detect whether an interference signal is at a higher frequency or a lower frequency than an output of the baseband filter of the second processing module, and to provide an IFD output signal indicative of the detection result. The logic module also includes a state machine coupled to the IFD module and to the local oscillator of the first processing module. The state machine is configured to provide a feedback signal to the local oscillator of the first processing module, based on the IFD output signal, to cause the local oscillator of the first processing module to update the corresponding oscillator signal so that the amplified input signal of the first processing module, when mixed with the updated oscillator signal, is not located at a frequency band of the interference signal.

In some embodiments, an input signal is amplified to provide an amplified input signal. An oscillator signal is generated. The amplified input signal is mixed with the oscillator signal, to provide a mixed signal. The mixed signal is filtered to pass a band of frequencies, to provide a filtered signal. Based on the filtered signal, a relative frequency location of an interference signal is detected. The detected frequency location of the interference signal may be relative to a desired signal for reception. A feedback signal is generated based on the detected relative frequency location. The oscillator signal is updated based on the feedback signal so that the amplified input signal, when mixed with the updated oscillator signal, is not located at a frequency band of the interference signal.

In some embodiments, first and second input signals are received from a first antenna and a second antenna, respectively. The first and second input signals are amplified to provide first and second amplified input signals, respectively. First and second oscillator signals are generated. The first and second amplified input signals are mixed with the first and second oscillator signals, respectively, to provide first and second mixed signals. The first and second mixed signals are filtered to pass a band of frequencies, to provide first and second filtered signals, respectively. Based on the second filtered signal, a relative frequency location of an interference signal is detected. A feedback signal is generated based on the detected relative frequency location. The first oscillator signal is updated based on the feedback signal so that the first amplified input signal, when mixed with the updated first oscillator signal, is not located at a frequency band of the interference signal.

BRIEF DESCRIPTION OF THE DRAWINGS

The following will be apparent from elements of the figures, which are provided for illustrative purposes and are not necessarily to scale.

FIGS. 5A-C are illustrations of receiver configurations in some embodiments.

FIGS. 6A-B are illustrations of interference in low intermediate frequency (LIF) modes.

DETAILED DESCRIPTION

This description of the exemplary embodiments is intended to be read in connection with the accompanying drawings, which are to be considered part of the entire written description.

Embodiments of the present disclosure provide a novel receiver architecture to optimize receiver performance in the presence of interference. In various embodiments, interference frequency detection methods are used to determine the exact nature of the interference and to optimize the performance correspondingly. Also, the actual method of optimizing the receiver performance is novel compared to the prior art in that the frequency of operation is optimized based on the nature of the interference as determined by frequency detection measurements.

Figure 1:
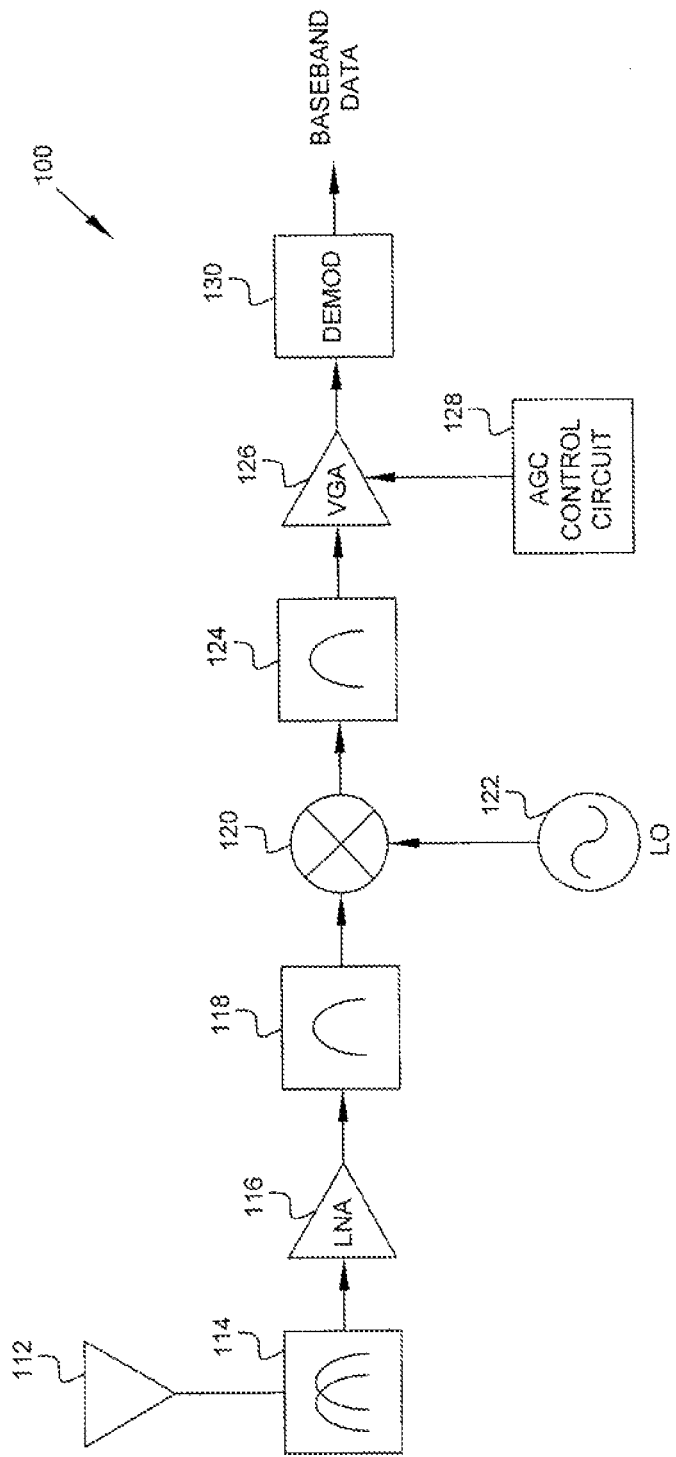
FIG. 1 is a block diagram of a receiver architecture known in the prior art.
Figure 2:
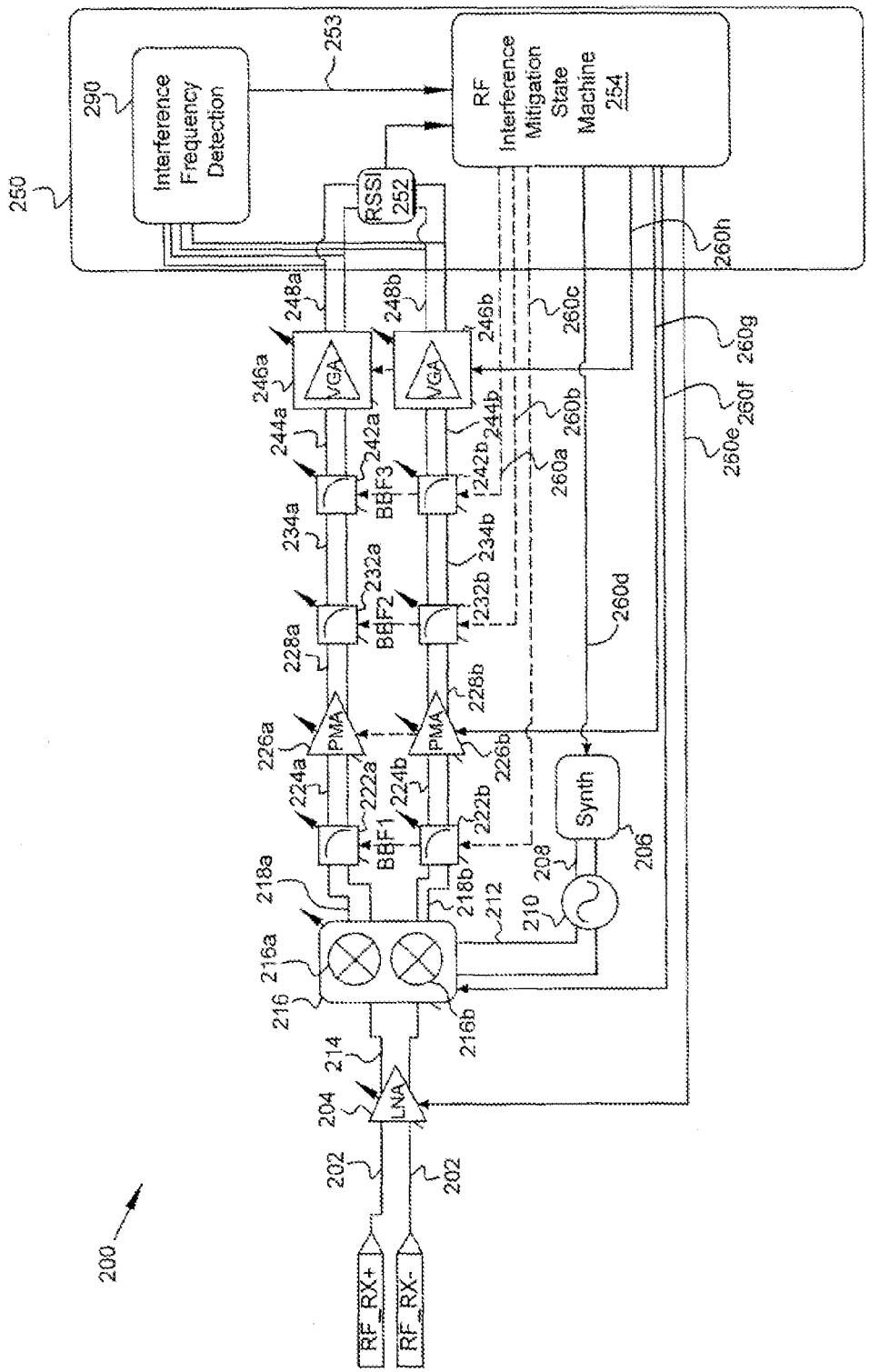
FIG. 2 is a block diagram of a system architecture in accordance with some embodiments of the present disclosure.

FIG. 2 is a block diagram of a system architecture of a receiver 200 in accordance with some embodiments of the present disclosure. An input signal 202 is received, e.g., from an antenna. The input signal is shown in differential form (RF_RX+ and RF_RX−); other signals in FIG. 2 may be in differential form but are not labeled as such, for visual clarity and to reduce clutter. The input signal is amplified by a low noise amplifier (LNA) 204 to provide an amplified input signal 214. A local oscillator 210 generates one or more oscillator signals 212 (e.g., sinusoids) based on signals 208 from a synthesizer 206. A mixer 216 mixes the amplified input signal 214 with the oscillator signal 212. The mixer may include in-phase and quadrature channels 216a and 216b. Separate processing pathways are shown in FIG. 2 for the in-phase and quadrature components (with similar reference characters but different suffixes, "a" or "b"), but the processing is similar for each, so the discussion below focuses on the top pathway in FIG. 2, which may be an in-phase or quadrature path. It is to be understood that the various feedback effects from state machine 254 to components such as filters and amplifiers may apply to components in either the in-phase or quadrature path.

Mixed signal 218a provided by mixer 216 is processed by a series of filters 222a, 232a, 242a, which may be baseband filters. These filters implement the overall interference rejection of the baseband, and they may have programmable bandwidths with many different settings. For example, a multi-mode receiver may have bandwidths from 100 kHz up to 10 MHz to support various modes like Global System for Mobile communications (GSM), Time Division-Synchronous Code Division Multiple Access (TD-SCDMA), Wideband Code Division Multiple Access (WCDMA), Long Term Evolution (LTE), and other communication standards as is known in the art. Also, the filters provide progressively more rejection as processing moves further toward the output (toward the right side of FIG. 2). Gain adjustment may be provided by a post-mixer amplifier (PMA) 226a and variable gain amplifier (VGA) 246a.

An interference frequency detection (IFD) module 290 may be coupled to one or more outputs of VGA 246a. IFD module 290 detects if interference is present and may detect whether the frequency of the interference is on the high side (above the desired signal to be received, i.e., at a higher frequency) or on the low side (below the desired signal to be received, i.e., at a lower frequency). The term "desired signal" refers to the signal transmitted by the transmitter and which, ideally, the receiver decodes. Details of IFD module 290 are provided further below.

Thus, mixed signal 218a is filtered by filter 222a to provide signal 224a, which is amplified to provide signal 228a. The amplified signal 228a is filtered to provide signal 234a and then filtered to provide signal 244a, which is amplified to provide signal 248a. A logic module 250 includes a received signal strength indication (RSSI) module 252, which measures power and provides an output 253 to an RF interference mitigation state machine 254. RSSI 252 is described further below. State machine 254 receives inputs from IFD module 290 and from RSSI 252, and provides feedback to LNA 204, synthesizer 206, mixer 216, PMA 226a (and/or 226b), and VGA 246a (and/or 246b). Feedback is provided to components in both the in-phase and quadrature processing pathways. State machine 254 may also provide signals 260c, 260b, and/or 260a to filters 222, 232, and/or 242 to enable one or more of the filters to be enabled. Logic module 250 may be coupled to a transmitter (not shown), which may provide a signal to an antenna for transmission.

State machine 254, which may be a digital state machine that may be implemented in various ways, controls circuitry in receiver 200 to perform RSSI measurements, determine the optimum configuration for the RF circuits, and provide feedback accordingly. State machine 254 may provide feedback via signal 260h to vary the gain of VGA 246a and/or 246b. The gain change may offset any gain changes in the LNA 204, mixer 216, and/or PMA 226a and/or 226b effected by state machine 254 through signals 260e, 260f, or 260g. A gain change in the VGA 246a will generally not improve the linearity of the receiver with interference since this VGA stage is after all the filter stages. However, if the gain of the LNA, mixer, and/or PMA is changed in order to improve the linearity, the gain of the VGA may be adjusted to compensate for the reduction of gain in those stages.

Figure 3:
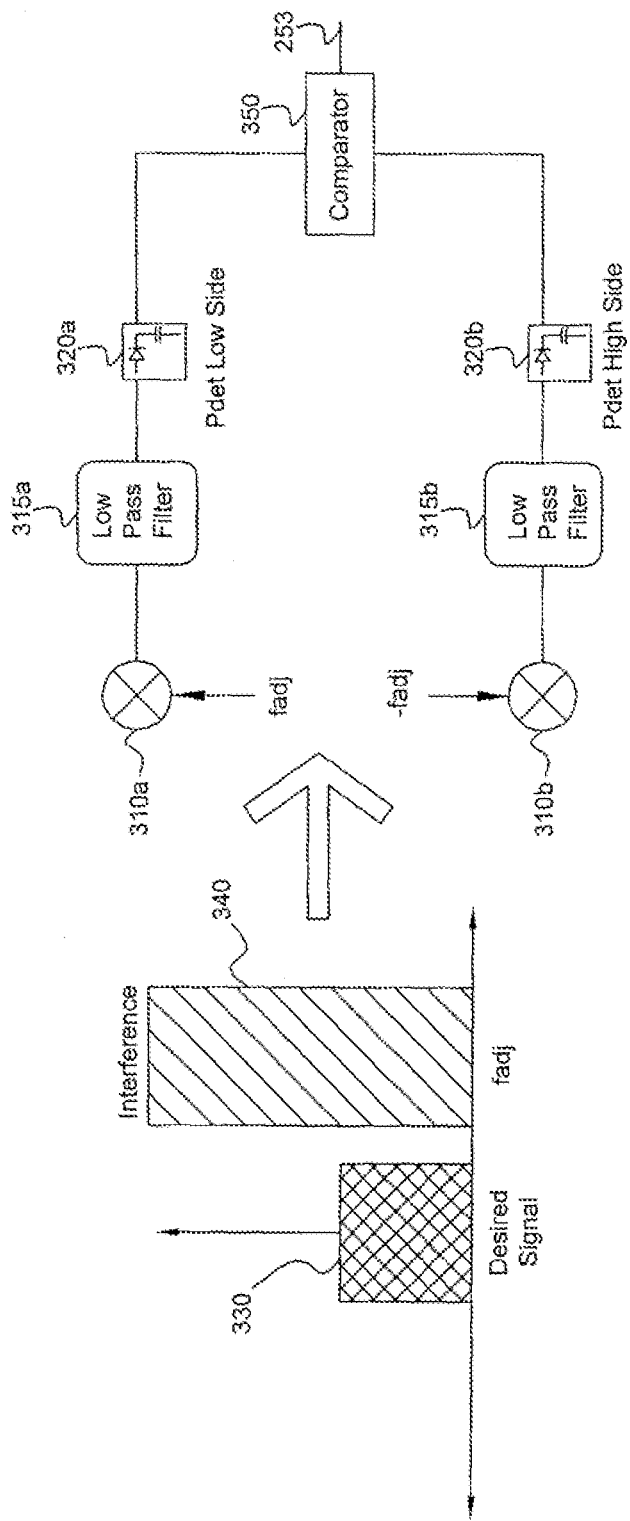
FIG. 3 is an illustration of interference frequency detection using complex mixing in accordance with some embodiments.

One implementation of IFD module 290 is shown in FIG. 3. This implementation uses complex mixers 310a, 310b to shift the received baseband signal by a specified offset (e.g., the adjacent channel offset) in the positive and negative directions. After low pass filtering at filters 315a, 315b, power detection is performed on the resultant signal using power estimation circuits 320a, 320b, which may be implemented as peak detectors, power detectors, or as any other kind of power estimation circuit. So for the case shown in FIG. 3, the Pdet High Side power is greater than the Pdet Low Side power (as determined by a comparator 350), indicating that the frequency of the interference 340 is on the high side relative to desired signal 330. While this detection is shown for the adjacent (denoted "adj") channel in a particular communications implementation, this technique may be applied for other frequency offsets also. The processing for the IFD module shown in FIG. 3 may be applied to a baseband signal in the in-phase or quadrature path shown in FIG. 2.

Figure 4:
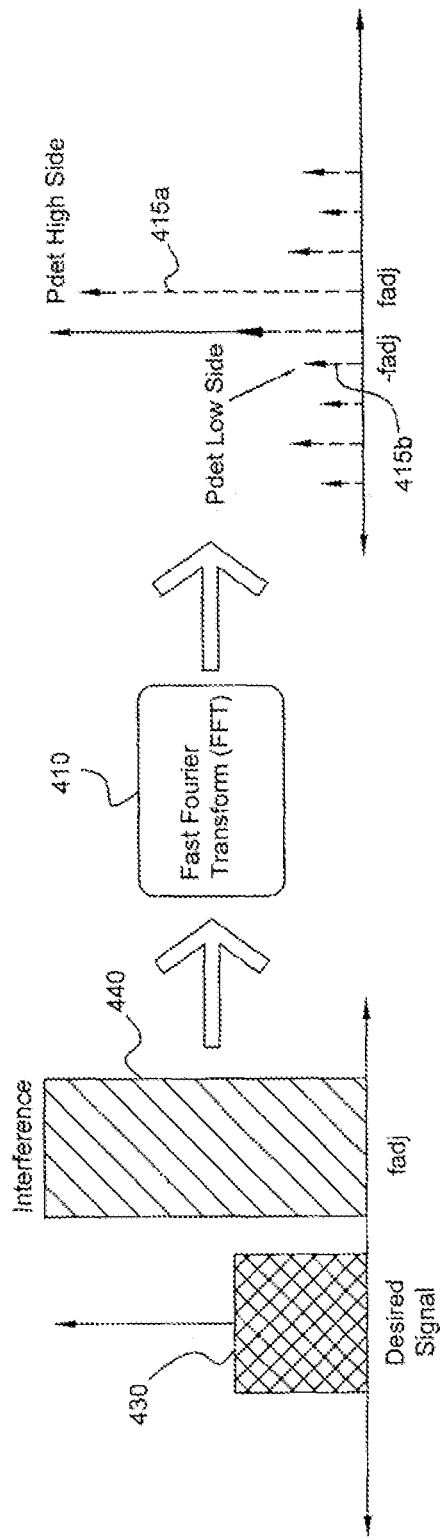
FIG. 4 is an illustration of interference frequency detection using a fast Fourier transform (FFT) in accordance with some embodiments.

Another implementation of IFD module 290 is shown in FIG. 4. A fast Fourier transform (FFT) 410 is performed on the input to IFD module 290 to detect the frequency of the interference. FFT processing is common in multimode architectures that support standards such as TD-SCDMA and LTE and may also be used for interference detection. FFT module 410 may be implemented in various ways as known in the art. By analyzing the FFT results in frequency bins such as the adjacent channel bins 415a (frequency bin for $f=f_{adj}$) and 415b (frequency bin for $f=-f_{adj}$), some embodiments of the present disclosure determine if interference is present and whether that interference 440 is on the high side or low side relative to desired signal 430.

The architecture described allows optimization of the receiver configuration depending on the presence of and the frequency of interference. For example, FIGS. 5A-C show three possible receiver configurations that may be used to receive a narrowband signal in accordance with the GSM or EDGE standards.

The three configurations are: (1) Direct conversion (DCR) mode as shown in FIG. 5A; Low Intermediate Frequency (LIF) Mode with Low Side Offset as shown in FIG. 5B; and Low Intermediate Frequency (LIF) Mode with High Side Offset as shown in FIG. 5C. In FIG. 5A, interference signals 520a, 520b are shown on either side of desired signal 510, which is located at zero frequency. In FIG. 5B, interference signal 540 is shown on the low side of desired signal 530, which has a low side offset (i.e., frequency offset such that the desired signal is located at a negative frequency offset). In FIG. 5C, interference signal 560 is shown on the high side of desired signal 550, which has a high side offset (i.e., frequency offset such that the desired signal is located at a positive frequency offset).

Figure 5A:
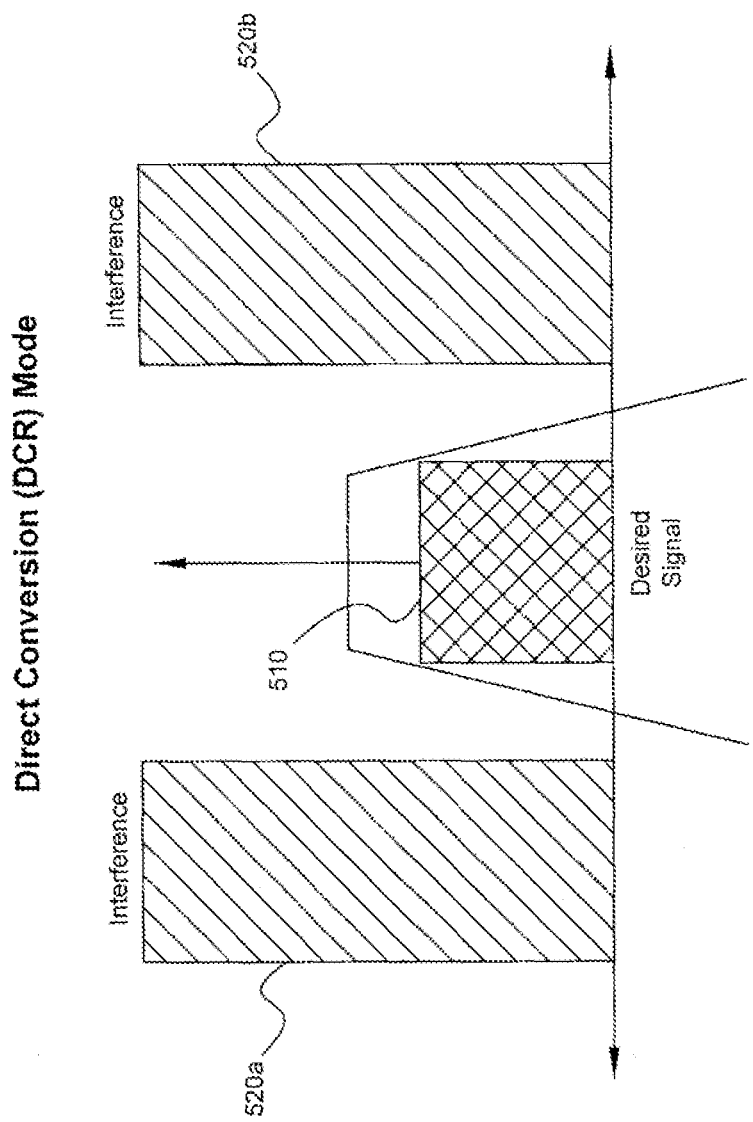
Figure 6B:
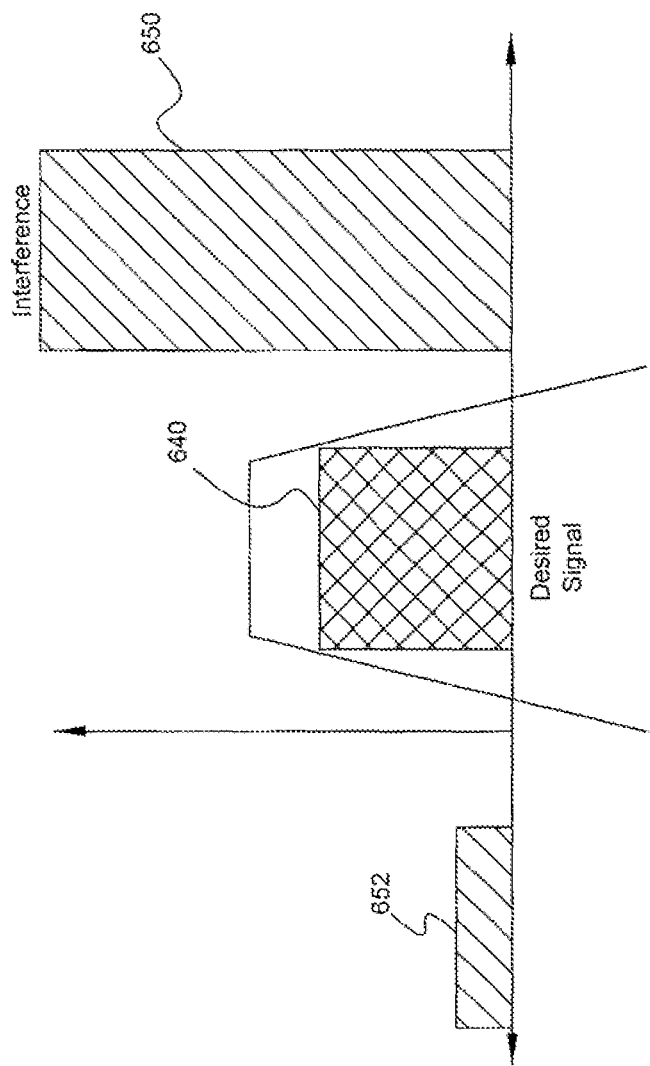

In general, the LIF modes of FIGS. 5B and 5C are preferred over the DCR mode of FIG. 5A, because the LIF modes can reject the DC offset imperfections in the RF circuits. However, the LIF modes may have performance issues in the presence of interference, as illustrated in FIGS. 6A-6B. LIF reception for high side interference (i.e., interference at a positive frequency) is shown for both low side offset (FIG. 6A) and high side offset (FIG. 6B) scenarios. Additionally, the image signal (an artifact of circuit imperfections present at the frequency having the same magnitude but opposite sign) created by the interference signal is also included in FIGS. 6A-6B. In FIG. 6A, interference 630 is shown on the high side (at a positive frequency), and the image 632 of the interference is located at the same frequency as desired signal 620. The image is present due to imperfections in the RF circuits and can only be improved to a certain level. Because of this, it is desirable to operate using the high side offset as in FIG. 6B, where the interference 650 is at a positive frequency, and the image 652 of the interference does not interfere with the desired signal 640.

Therefore, if the interference frequency detection (IFD) module 290 indicates that the interference is on the high side (relative to the desired signal), then in some embodiments of the present disclosure, reception may be performed using Low Intermediate Frequency Mode with High Side Offset. If the interference is on the low side (relative to the desired signal), then reception may be performed using Low Intermediate Frequency Mode with Low Side Offset. If interference is present on both low and high sides, then reception may be performed using Direct Conversion Mode. As these modes correspond to various frequencies of the desired signal, the modes may be selected by appropriate generation of the oscillator signal 212 that feeds mixer 216. For example, state machine 254 may send a signal 260d to synthesizer 206 to cause the appropriate oscillator signal to be generated to configure the receiver in one of the modes. Thus, state machine 254 selects the appropriate receiver mode based on the detected presence and relative location of interference as identified by IFD module 290.

Figure 7:
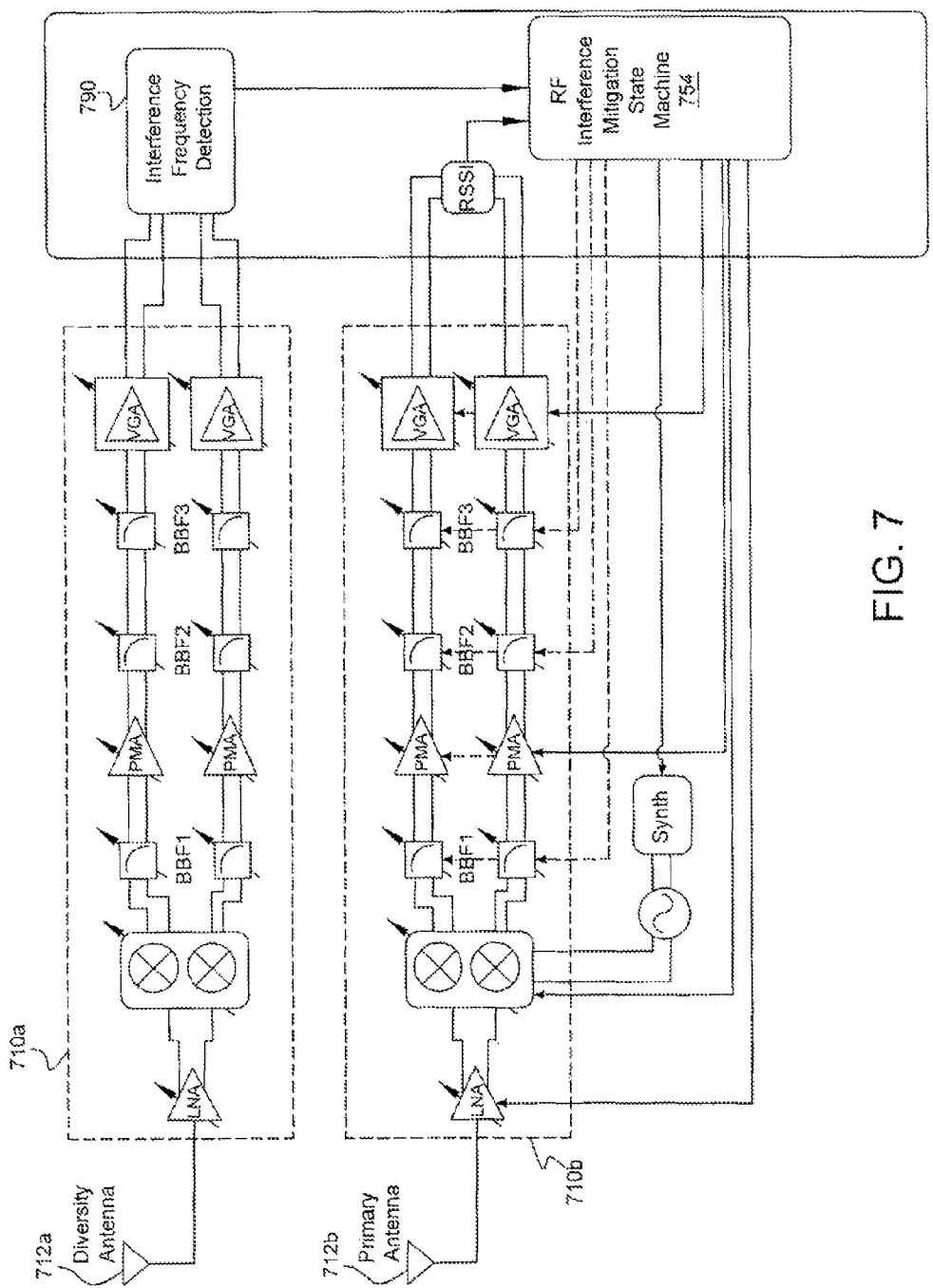
FIG. 7 is a block diagram of a multiple input multiple output (MIMO) receiver architecture in accordance with some embodiments.

The receiver architecture of FIG. 2 may also be implemented efficiently for a MIMO (multiple input multiple output) system as shown in FIG. 7. Because of the MIMO requirements for 3G and 4G cellular systems, a diversity receiver is often included in the RF and baseband architecture. This additional receiver is not needed for GSM/EDGE mode and therefore may be used to perform the interference frequency detection described above. Based on this information, the mode of the receiver(s) may be optimally configured based on the determined interference level and/or the frequency of the interference.

FIG. 7 shows a receiver module 710b, which may receive an input from a primary receive antenna 712b, and a receiver module 710a, which may receive an input from a diversity antenna 712a. Processing in each of the receiver modules is similar to processing discussed above in the context of FIG. 2, and only certain differences from FIG. 2 are discussed below. The diversity receiver module 710a may be used for interference frequency detection at interference frequency detection module 790. State machine 754 may provide feedback signals as shown in FIG. 7.

The use of the diversity receiver in some embodiments to perform interference estimation in parallel provides several advantages. One advantage is that the diversity receiver can be adjusted to any bandwidth option that is desired at any time in order to detect interference. The primary receiver is tasked with receiving the desired signal and therefore the baseband filters have limited bandwidth during the desired reception slot to limit noise and interference. The diversity receiver, when used for interference detection, has no such limitation, so the bandwidth can be increased as desired. Another advantage is that the diversity receiver gain may be adjusted for the best performance to check the interference without considering the desired signal. The primary receiver must receive the desired signal and therefore the gain control is set in that receiver to optimize the level of that signal. The diversity receiver, when used for interference detection, is again not constrained by the need to receive the desired signal, and therefore the gain may be optimized to detect interference.

Figure 8:
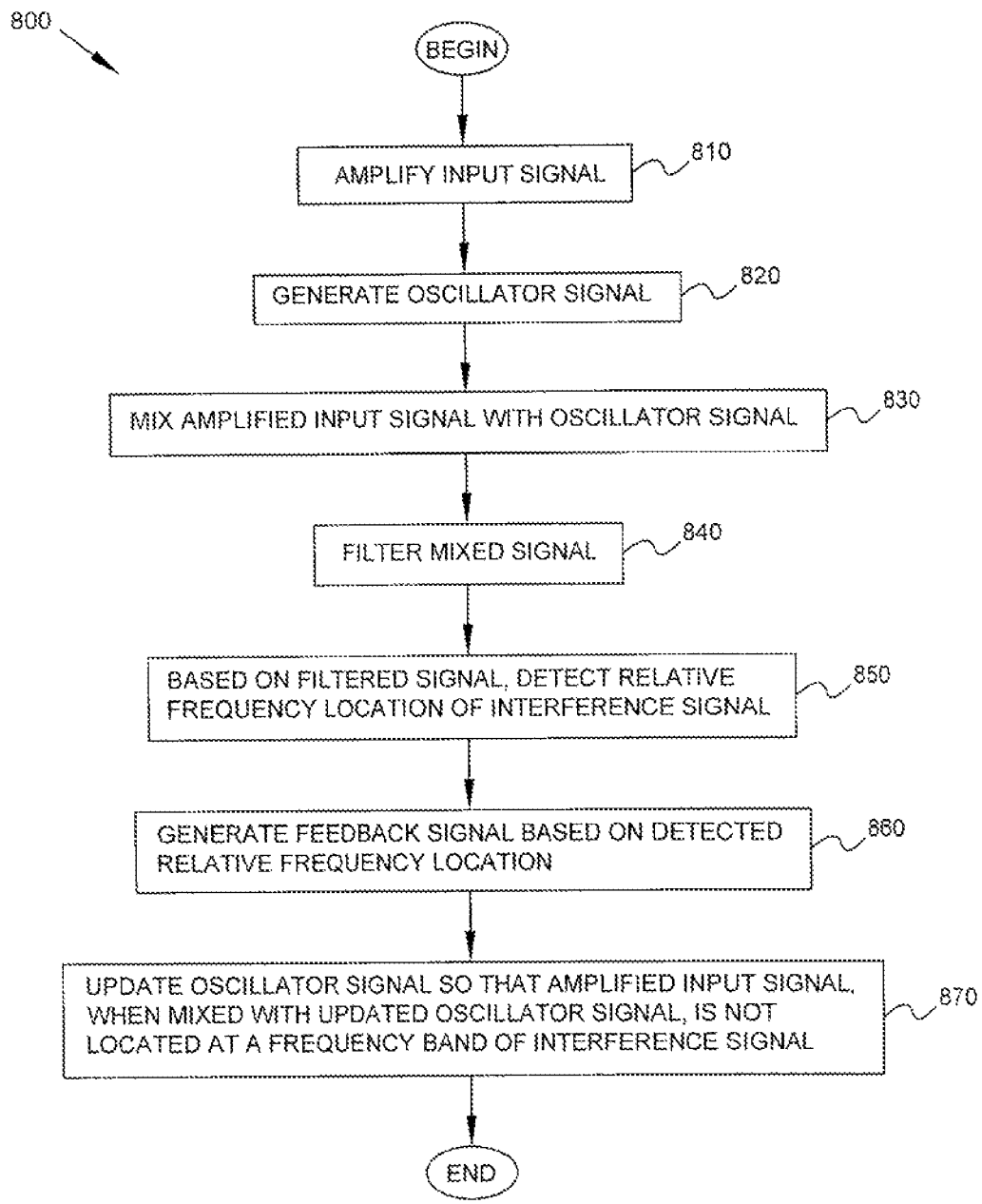
FIG. 8 is a flow diagram of a process in accordance with some embodiments.

FIG. 8 is a flow diagram of a process in accordance with some embodiments. After process 800 begins, an input signal (e.g., signal 202) is amplified (block 810), to provide an amplified input signal (e.g., signal 214). An oscillator signal (e.g., signal 202) is generated (block 820). The amplified input signal is mixed (block 830) with the oscillator signal, to provide a mixed signal (e.g., signal 218a). The mixed signal is filtered (block 840) to pass a band of frequencies, to provide a filtered signal (e.g., signal 224a). Based on the filtered signal, a relative frequency location of an interference signal is detected (block 850). The detected frequency location of the interference signal may be relative to a desired signal for reception. A feedback signal (e.g., signal 260d) is generated (block 860) based on the detected relative frequency location. The oscillator signal is updated (block 870) based on the feedback signal so that the amplified input signal, when mixed with the updated oscillator signal, is not located at a frequency band of the interference signal.

In some embodiments, detecting the relative frequency location of the interference signal may be based on complex mixing. The filtered signal may be shifted, directly or after additional filtering or amplification, by a predetermined offset in a first direction, to provide a low side shifted signal. The low side shifted signal may be low pass filtered, to provide a low pass filtered low side signal. The power of the low pass filtered low side signal may be measured, to provide a low side power measurement. The filtered signal may be shifted, directly or after additional filtering or amplification, by the predetermined offset in a second direction opposite the first direction, to provide a high side shifted signal. The high side shifted signal may be low pass filtered, to provide a low pass filtered high side signal. The power of the low pass filtered high side signal may be measured, to provide a high side power measurement. The low side power measurement, the high side power measurement, or both, may be compared to a predetermined threshold.

Updating the oscillator signal may cause the amplified input signal to be shifted higher in frequency, when the high side power measurement is greater than the predetermined threshold, may cause the amplified input signal to be shifted lower in frequency, when the low side power measurement is greater than the predetermined threshold, and may cause the amplified input signal to be shifted neither higher nor lower in frequency, when both the high side power measurement and the low side power measurement are greater than the predetermined threshold.

In some embodiments, detecting the relative frequency location of the interference signal may be based on fast Fourier transform (FFT) processing. A FFT may be performed on the filtered signal, directly or after additional filtering or amplification to provide a frequency domain signal. A comparison may be made between a predetermined threshold and the frequency domain signal at a first frequency bin, corresponding to a predetermined frequency magnitude and a first sign (e.g., positive). A comparison may also be made between the predetermined threshold and the frequency domain signal at a second frequency bin, corresponding to the predetermined frequency magnitude and a second sign opposite the first sign (e.g., negative). Based on the comparison, the relative location frequency location of the interference signal may be determined.

The amplified input signal may be shifted higher in frequency when the frequency domain signal at the first frequency bin is greater than the predetermined threshold, may be shifted lower in frequency when the frequency domain signal at the second frequency bin is greater than the predetermined threshold, and may shifted neither higher nor lower in frequency when the frequency domain signal at both the first and second frequency bins is greater than the predetermined threshold.

Figure 9:
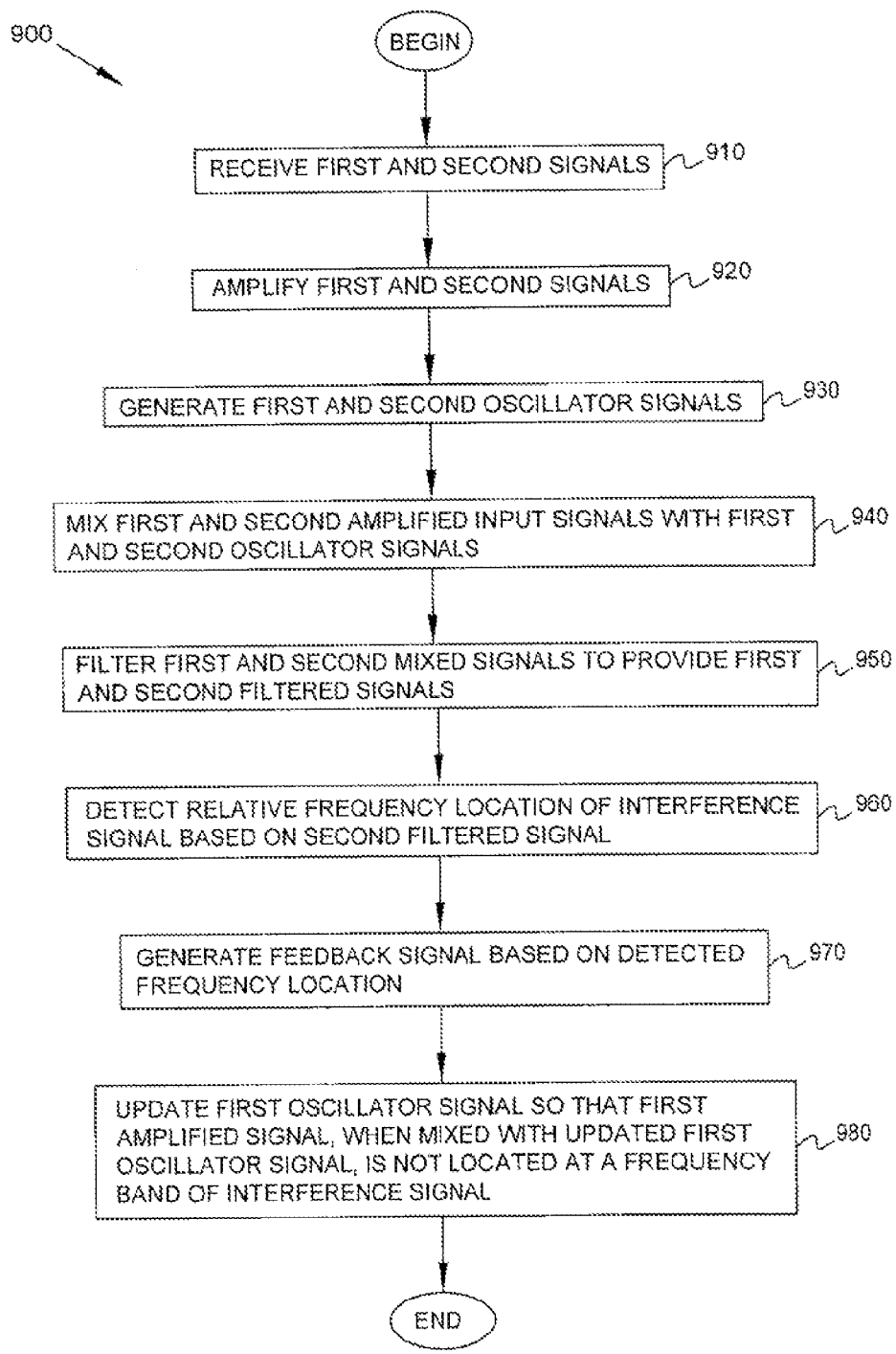
FIG. 9 is a flow diagram of a process in accordance with some embodiments.

FIG. 9 is a flow diagram of a process in accordance with some embodiments. After process 900 begins, first and second input signals are received (block 910) from a first antenna and a second antenna, respectively. The first and second input signals are amplified (block 920) to provide first and second amplified input signals, respectively. First and second oscillator signals are generated (block 930). The first and second amplified input signals are mixed (block 940) with the first and second oscillator signals, respectively, to provide first and second mixed signals. The first and second mixed signals are filtered (block 950) to pass a band of frequencies, to provide first and second filtered signals, respectively. Based on the second filtered signal, a relative frequency location of an interference signal is detected (block 960). A feedback signal is generated (block 970) based on the detected relative frequency location. The first oscillator signal is updated (block 980) based on the feedback signal so that the first amplified input signal, when mixed with the updated first oscillator signal, is not located at a frequency band of the interference signal.

Although examples are illustrated and described herein, embodiments are nevertheless not limited to the details shown, since various modifications and structural changes may be made therein by those of ordinary skill within the scope and range of equivalents of the claims.

What is claimed is:

1. A method comprising:
   receiving a filtered signal;
   detecting, based on the filtered signal, a relative frequency location of an interference signal;
   generating a feedback signal based on the detected relative frequency location, and
   updating an oscillator signal based on the feedback signal, to cause a shift in energy in the input signal away from the detected frequency location.

2. The method of claim 1, wherein detecting the relative frequency location of the interference signal includes:
   shifting the filtered signal, directly or after additional filtering or amplification, by a predetermined offset in a first direction, to provide a low side shifted signal;
   low pass filtering the low side shifted signal, to provide a low pass filtered low side signal;
   measuring power of the low pass filtered low side signal, to provide a low side power measurement;
   shifting the filtered signal, directly or after additional filtering or amplification, by the predetermined offset in a second direction opposite the first direction, to provide a high side shifted signal;
   low pass filtering the high side shifted signal, to provide a low pass filtered high side signal;
   measuring power of the low pass filtered high side signal, to provide a high side power measurement; and
   comparing a predetermined threshold and at least one of the low side power measurement and the high side power measurement.

3. The method of claim 2, wherein updating the oscillator signal includes updating the oscillator signal to cause the input signal to be shifted higher in frequency, when the high side power measurement is greater than the predetermined threshold.

4. The method of claim 2, wherein updating the oscillator signal includes updating the oscillator signal to cause the input signal to be shifted lower in frequency, when the low side power measurement is greater than the predetermined threshold.

5. The method of claim 2, wherein updating the oscillator signal includes updating the oscillator signal to cause the input signal to be neither shifted higher nor lower in frequency, when the high side power measurement and the low side power measurement are greater than the predetermined threshold.

6. The method of claim 1, wherein detecting the relative frequency location of the interference signal includes:
   performing a fast Fourier transform (FFT) on the filtered signal, directly or after additional filtering or amplification to provide a frequency domain signal;
   comparing a predetermined threshold and at least one of the frequency domain signal at a first frequency bin, corresponding to a predetermined frequency magnitude and a first sign, and the frequency domain signal at a second frequency bin, corresponding to the predetermined frequency magnitude and a second sign opposite the first sign.

7. The method of claim 6, wherein the feedback signal is configured to cause the updated oscillator signal, provided to a mixer, to shift the input signal higher in frequency, when the frequency domain signal at the first frequency bin is greater than the predetermined threshold.

8. The method of claim 6, wherein the feedback signal is configured to cause the updated oscillator signal, provided to a mixer, to shift the input signal lower in frequency, when the frequency domain signal at the second frequency bin is greater than the predetermined threshold.

9. The method of claim 6, wherein the feedback signal is configured to cause the updated oscillator signal, provided to a mixer, to neither shift the input signal higher nor lower in frequency, when the frequency domain signal at the first and second frequency bins is greater than the predetermined threshold.

10. An interference frequency detection (IFD) module comprising:
    a low side mixer configured to shift an input of the IFD module by a predetermined offset in a first direction;
    a first low pass filter configured to filter an output of the low side mixer;
    a low side power estimation circuit configured to measure power at an output of the first low pass filter;
    a high side mixer configured to shift the input of the IFD module by the predetermined offset in a second direction opposite the first direction;
    a second low pass filter configured to filter an output of the high side mixer;
    a high side power estimation circuit configured to measure power at an output of the second low pass filter; and
    a comparator configured to output an IFD output signal based on a comparison between a predetermined threshold and at least one of an output of the low side power estimation circuit and an output of the high side power estimation circuit.

11. The IFD module of claim 10, wherein updating the oscillator signal includes updating the oscillator signal to cause the input signal to be shifted higher in frequency, when the high side power measurement is greater than the predetermined threshold.

12. The IFD module of claim 10, wherein updating the oscillator signal includes updating the oscillator signal to cause the input signal to be shifted lower in frequency, when the low side power measurement is greater than the predetermined threshold.

13. The IFD module of claim 10, wherein updating the oscillator signal includes updating the oscillator signal to cause the input signal to be neither shifted higher nor lower in frequency, when the high side power measurement and the low side power measurement are greater than the predetermined threshold.

14. The IFD module of claim 10, further comprising:
    a detector configured to detecting a relative frequency location of the interference signal by performing a fast Fourier transform (FFT) on the filtered signal, directly or after additional filtering or amplification to provide a frequency domain signal, and comparing a predetermined threshold and at least one of the frequency domain signal at a first frequency bin, corresponding to a predetermined frequency magnitude and a first sign, and the frequency domain signal at a second frequency bin, corresponding to the predetermined frequency magnitude and a second sign opposite the first sign.

15. The IFD module of claim 14,
    wherein a state machine is coupled to the output of the IFD module, the state machine is configured to provide a feedback signal, based on the IFD output signal, for causing a shift in energy in an input signal of the filter away from the detected frequency location.

16. The IFD module of claim 14, wherein the feedback signal is configured to cause the updated oscillator signal, provided to a mixer, to shift the input signal higher in frequency, when the frequency domain signal at the first frequency bin is greater than the predetermined threshold.

17. The IFD module of claim 14, wherein the feedback signal is configured to cause the updated oscillator signal, provided to a mixer, to shift the input signal lower in frequency, when the frequency domain signal at the second frequency bin is greater than the predetermined threshold.

18. The IFD module of claim 14, wherein the feedback signal is configured to cause the updated oscillator signal, provided to a mixer, to neither shift the input signal higher nor lower in frequency, when the frequency domain signal at the first and second frequency bins is greater than the predetermined threshold.

19. An apparatus comprising:
an interference frequency detection (IFD) module configured to receive a filtered signal, to detect, based on the filtered signal, a relative frequency location of an interference signal, to provide an IFD output signal indicative of the detection result at an output of the IFD module; and
a state machine, coupled to the output of the IFD module configured to generate a feedback signal based on the detected relative frequency location, and to update an oscillator signal based on the feedback signal, to cause a shift in energy in an input signal away from the detected frequency location.

20. The apparatus of claim 19, the IFD module comprising:
a low side mixer configured to shift an input of the IFD module by a predetermined offset in a first direction;
a first low pass filter configured to filter an output of the low side mixer;
a low side power estimation circuit configured to measure power at an output of the first low pass filter;
a high side mixer configured to shift the input of the IFD module by the predetermined offset in a second direction opposite the first direction;
a second low pass filter configured to filter an output of the high side mixer;
a high side power estimation circuit configured to measure power at an output of the second low pass filter; and
a comparator configured to output an IFD output signal based on a comparison between a predetermined threshold and at least one of an output of the low side power estimation circuit and an output of the high side power estimation circuit.

* * * * *